United States Patent
Koizumi et al.

(10) Patent No.: US 7,932,928 B2
(45) Date of Patent: Apr. 26, 2011

(54) METHOD, APPARATUS, AND COMPUTER PROGRAM PRODUCT FOR IMAGE PROCESSING WITH SCENE-DEPENDENT IMAGE PROCESSING CONDITION

(75) Inventors: Takahiko Koizumi, Nagano-ken (JP); Ikuo Hayaishi, Nagano-ken (JP); Toshie Imai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 310 days.

(21) Appl. No.: 11/983,665

(22) Filed: Nov. 9, 2007

(65) Prior Publication Data

US 2008/0170134 A1    Jul. 17, 2008

Related U.S. Application Data

(62) Division of application No. 10/634,741, filed on Aug. 4, 2003, now abandoned.

(30) Foreign Application Priority Data

Aug. 7, 2002 (JP) .............................. 2002-230025(P)

(51) Int. Cl.
*H04N 5/235* (2006.01)
(52) U.S. Cl. .................................................. 348/222.1
(58) Field of Classification Search ............... 348/231.2, 348/231.99, 231.6, 222.1
See application file for complete search history.

(56) References Cited

U.S. PATENT DOCUMENTS

| 6,011,547 A * | 1/2000 | Shiota et al. | 382/254 |
| 7,184,078 B2 * | 2/2007 | Okisu et al. | 348/222.1 |

FOREIGN PATENT DOCUMENTS

| JP | 06-253147 | 9/1994 |
| JP | 10-191246 | 7/1998 |
| JP | 11-239269 | 8/1999 |
| JP | 11-345322 | 12/1999 |
| JP | 2001-186297 | 7/2001 |
| JP | 2001-238177 | 8/2001 |
| JP | 2001-273476 | 10/2001 |

(Continued)

OTHER PUBLICATIONS

Translation of publication JP 2001-186297, Nitta Takashi, Jul. 6, 2001.*

(Continued)

*Primary Examiner* — Nicholas G Giles
(74) *Attorney, Agent, or Firm* — Martine Penilla & Gencarella, LLP

(57) ABSTRACT

When an acquired image file GF includes image processing control information GI, a CPU executes image quality adjustment of image data GD in an image processing mode GM specified by the image processing control information GI. When the acquired image file GF does not include the image processing control information GI, on the other hand, the CPU retrieves Exif information and in the case of successful retrieval of the Exif information, selects the image processing mode GM based on the Exif information and executes image quality adjustment of the image data GD in the selected image processing mode GM. In the case where a selected shooting mode is described in the Exif information, the selected shooting mode is used for the selection of the image processing mode GM. In the case where no selected shooting mode is described in the Exif information, on the other hand, another shooting condition is used for the selection of the image processing mode GM.

3 Claims, 9 Drawing Sheets

FOREIGN PATENT DOCUMENTS

JP     2002-238013     8/2002

OTHER PUBLICATIONS

Abstract of Japanese Patent Publication No. 06-253147, Pub. Date: Sep. 9, 1994, Patent Abstracts of Japan.
Abstract of Japanese Patent Publication No. 10-191246, Pub. Date: Jul. 21, 1998, Patent Abstracts of Japan.
Abstract of Japanese Patent Publication No. 11-239269, Pub. Date: Aug. 31, 1999, Patent Abstracts of Japan.
Abstract of Japanese Patent Publication No. 11-345322, Pub. Date: Dec. 14, 1999, Patent Abstracts of Japan.
Abstract of Japanese Patent Publication No. 2001-186297, Pub. Date: Jul. 6, 2001, Patent Abstracts of Japan.
Abstract of Japanese Patent Publication No. 2001-238177, Pub. Date: Aug. 31, 2001, Patent Abstracts of Japan.
Abstract of Japanese Patent Publication No. 2001-273476, Pub. Date: Oct. 5, 2001, Patent Abstracts of Japan.
Abstract of Japanese Patent Publication No. 2002-238013, Pub. Date: Aug. 28, 2002, Patent Abstracts of Japan.

* cited by examiner

| Mode | Contrast | Lightness | Color Balance | Saturation | Sharpness | Stored Color | Noise Reduction |
|---|---|---|---|---|---|---|---|
| 1 | Standard | Standard | Standard | Standard | Standard | Off | Off |
| 2 | Slightly Softer | Slightly Brighter | Standard | Slightly Lower | Slightly Weaker | Flesh Color | Off |
| 3 | Slightly Harder | Standard | Standard | Slightly Higher | Slightly Stronger | Sky Blue / Green | Off |
| 4 | Standard | Darker | Off | Standard | Slightly Weaker | Red | On |
| 5 | Standard | Darker | Off | Standard | Standard | Off | On |
| 6 | Slightly Softer | Slightly Brighter | Weaker | Slightly Higher | Standard | Green | Off |
| 7 | Standard | Standard | Weaker | Standard | Stronger | Off | Off |
| 8 | Harder | Standard | Standard | Slightly Higher | Stronger | Off | Off |
| 9 | Slightly Softer | Brighter | Standard | Standard | Standard | Off | Off |
| 10 | Standard | Standard | Standard | Higher | Slightly Stronger | Red | Off |
| 11 | Standard | Slightly Brighter | Standard | Standard | Slightly Stronger | Flesh Color | Off |

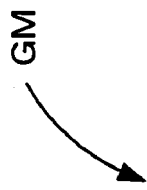

| | Portrait (Upper Body) | Portrait (Entire Body) | Portrait (Backlight) | Group Photo | Landscape | Nightscape | Nightscape + Portrait | Flower | Macro | Sports | Fluid |
|---|---|---|---|---|---|---|---|---|---|---|---|
| Exposure Program | Exposure Priority | Exposure Priority | Exposure Priority | Exposure Priority | Exposure Priority | Exposure Priority | Exposure Priority | Exposure Priority | Exposure Priority | Shutter Priority | Shutter Priority |
| Aperture Value (F Number) | Small | Small | Small | Large | Large | Large | Small | Small | Large | – | – |
| Shutter Speed | – | – | – | – | – | – | – | – | – | High Speed | Low Speed |
| Subject Distance Range | Close-up View | Distant View | Close-up View/ Distant View | Distant View | Distant View | Distant View | Close-up View/ Distant View | Macro | Macro | – | – |
| ISO Speed | – | – | – | – | – | ISO 400 or Higher | ISO 400 or Higher | ISO 100 or Lower | ISO 100 or Lower | – | – |
| Flash | | | Forcible Emission | | Prohibited Emission | Prohibited Emission | Forcible Emission + Red Eye Reduction | | | | |
| GI Mode | 2 | 2 | 2 | 11 | 3 | 5 | 5 | 6 | 7 | 8 | 1 | ced
METHOD, APPARATUS, AND COMPUTER PROGRAM PRODUCT FOR IMAGE PROCESSING WITH SCENE-DEPENDENT IMAGE PROCESSING CONDITION

CROSS REFERENCE TO RELATED APPLICATION

This application is a divisional of U.S. application Ser. No. 10/634,741, filed on Aug. 4, 2003 now abandoned. The disclosure of this prior application from which priority is claimed is incorporated herein by reference.

FIELD OF TECHNOLOGY

The present invention relates to an image processing technique that uses shooting information or information on specification of image processing to implement the image processing of image data.

BACKGROUND OF THE INVENTION

Digital still cameras (DSC) having shooting modes corresponding to various shooting scenes, such as portrait and nightscape have been widely used. In response to selection of a shooting mode, the DSC is set to have preset values of multiple shooting parameters, such as shutter speed and exposure, corresponding to the selected shooting mode. The photographer is thus not required to individually set the shooting parameters and easily takes photographs of a subject under shooting conditions specified by the selected shooting mode. In the case of image data complying with a DSC file format standard Exif 2.2, the selected shooting mode is written, together with other shooting conditions including a shutter speed, an exposure mode, and a light source, in a header or an equivalent portion of the image data.

The applicant of the invention has proposed a practical technique that sets image processing control information for specifying image processing conditions adopted in an image processing apparatus according to the shooting mode selected in the DSC, the shooting conditions, and the reproduction characteristics of an output device, and outputs the settings of the image processing control information related to image data. This technique ensures image processing suitable for the shooting mode selected by the photographer (that is, image processing reflecting the intention of the photographer). The image processing control information used in this technique is set by taking into account the reproduction characteristics of the output device and is thus substantially different from the shooting information, which simply describes the shooting conditions.

The shooting information including the shooting mode is, however, included in a greater number of image data (image files), compared with the image processing control information. When the image processing control information is not available, it is desirable to utilize the shooting information and thereby make a greater number of image data subjected to image processing suitable for a shooting scene at the time of shooting (that is, a shooting mode selected by the photographer).

SUMMARY OF THE INVENTION

In order to solve the above problems of the prior art technique, the present invention aims to make a greater number of image data subjected to a series of image processing suitable for a shooting scene at a time of shooting each of the image data.

A first application of the invention to attain the above object is directed to an image processing method that makes image data, which includes shooting information obtained at a time of shooting, subjected to a series of image processing suitable for a selected shooting scene. The image processing method in the first application of the invention acquires image data; retrieves scene-dependent image processing condition specification information, which is related to the acquired image data and is used to specify a scene-dependent image processing condition suitable for the selected shooting scene; specifies the selected shooting scene based on the shooting information, in the case of failed retrieval of the scene-dependent image processing condition specification information; acquires a scene-dependent image processing condition suitable for the specified shooting scene from a memory device, which stores multiple scene-dependent image processing conditions set for multiple shooting scenes; and executes image quality adjustment of the image data with the acquired scene-dependent image processing condition.

In accordance with the first application of the invention, even when the scene-dependent image processing condition specification information, which is used to specify the scene-dependent image processing condition suitable for the selected shooting scene, is not available, the image processing method in the first application of the invention utilizes the general shooting information given as attribute information of the image data to obtain the scene-dependent image processing condition suitable for the selected shooting scene and executes image quality adjustment with the obtained scene-dependent image processing condition. This arrangement desirably enables a greater number of image data to be subjected to the image processing suitable for the shooting scene at the time of shooting each of the image data.

In the first application of the invention, in the case of successful retrieval of the scene-dependent image processing condition specification information, the image processing method may acquire the scene-dependent image processing condition corresponding to the retrieved scene-dependent image processing condition specification information from the memory device. In this arrangement, the scene-dependent image processing condition may be acquired, based on the scene-dependent image processing condition specification information representing the photographer's intention at the time of shooting, thus ensuring execution of image quality adjustment reflecting the intention of the photographer.

In another preferable arrangement of the first application of the invention, when the shooting information includes preset information of shooting scene, the image processing method may specify the shooting scene, based on the preset information of shooting scene. In this arrangement, the preset information of shooting scene at the time of shooting is utilized to acquire the scene-dependent image processing condition, which reflects the shooting scene, and thereby ensures execution of image quality adjustment suitable for the shooting scene.

In the image processing method according to the first application of the invention, one preferable procedure specifies the shooting scene, based on information on settings of exposure program, aperture, shutter speed, subject distance range, ISO speed rate, and flash included in the shooting information. These pieces of the shooting information may be used for estimation of the shooting scene.

In the image processing method according to the first application of the invention, when the shooting information does not include the preset information of shooting scene, the shooting scene may be specified, based on information on settings of exposure program, aperture, shutter speed, subject distance range, ISO speed rate, and flash included in the shooting information. This arrangement ensures execution of image quality adjustment suitable for the shooting scene, even when the information of shooting scene is not available.

In the image processing method according to the first application of the invention, the scene-dependent image processing condition may be a combination of values of multiple image quality-relating parameters, which are set in advance for each shooting scene. This arrangement ensures adaptation of image quality adjustment for the shooting scene with a high accuracy.

The first application of the invention is also actualized by an image processing apparatus that makes image data, which includes shooting information obtained at a time of shooting, subjected to a series of image processing suitable for a selected shooting scene. The image processing apparatus in the first application of the invention includes: an image data acquisition module that acquires image data; a memory module that stores multiple scene-dependent image processing conditions set for multiple shooting scenes; a scene-dependent image processing condition acquisition module that, in the case of failed retrieval of scene-dependent image processing condition specification information, which is related to the acquired image data and is used to specify a scene-dependent image processing condition suitable for the selected shooting scene, specifies the selected shooting scene based on the shooting information and acquires a scene-dependent image processing condition suitable for the specified shooting scene from the memory module; and an image quality adjustment module that executes image quality adjustment of the image data with the acquired scene-dependent image processing condition.

The image processing apparatus according to the first application of the invention has similar functions and effects to those of the image processing method in the first application of the invention and has various arrangements as discussed above with regard to the image processing method.

The first application of the invention is further actualized by a computer program product storing a program that causes a computer to utilize multiple scene-dependent image processing conditions set for multiple shooting scenes and to make image data, which includes shooting information obtained at a time of shooting, subjected to a series of image processing suitable for a selected shooting scene. In the computer program product according to the first application of the invention, the program includes: a computer command that retrieves scene-dependent image processing condition specification information, which is related to acquired image data and is used to specify a scene-dependent image processing condition suitable for the selected shooting scene; a computer command that specifies the selected shooting scene based on the shooting information, in the case of failed retrieval of the scene-dependent image processing condition specification information; a computer command that selects a scene-dependent image processing condition suitable for the specified shooting scene among the multiple scene-dependent image processing conditions; and a computer command that executes image quality adjustment of the image data with the selected scene-dependent image processing condition.

The computer program product according to the first application of the invention has similar functions and effects to those of the image processing method in the first application of the invention and has various arrangements as discussed above with regard to the image processing method.

A second application of the invention is directed to an image processing method that executes a series of image processing suitable for a shooting scene selected at a time of shooting. The image processing method in the second application of the invention acquires image data; retrieves image processing control information, which specifies a scene-dependent image processing condition suitable for the selected shooting scene and is related to the acquired image data; in the case of successful retrieval of the image processing control information, acquired the scene-dependent image processing condition specified by the retrieved image processing control information from a memory device, which stores multiple scene-dependent image processing conditions as combinations of values of multiple image quality-relating parameters set in advance for multiple shooting scenes; and executes image quality adjustment of the image data with the acquired scene-dependent image processing condition.

The image processing method in the second application of the invention utilizes the image processing control information, which is used to specify the scene-dependent image processing condition suitable for the selected shooting scene, to acquire the scene-dependent image processing condition suitable for the shooting scene and executes image quality adjustment with the obtained scene-dependent image processing condition. This arrangement desirably enables the scene-dependent image processing condition, which represents the photographer's intention at the time of shooting, to be obtained adequately, thus ensuring execution of image quality adjustment reflecting the intention of the photographer.

In one preferable arrangement of the second application of the invention, the image processing method determines the shooting scene selected at the time of shooting, based on the shooting information. In the case of failed retrieval of the image processing control information, the image processing method acquires out the scene-dependent image processing condition suitable for the definitely set shooting scene from the memory device. In such cases, the procedure of this arrangement utilizes the general shooting information given as attribute information of the image data to acquire the scene-dependent image processing condition suitable for the shooting scene. This desirably enables a greater number of image data to be subjected to image quality adjustment suitable for the shooting scene at the time of shooting each of the image data.

The second application of the invention is also actualized by an image processing apparatus that executes a series of image processing suitable for a shooting scene selected at a time of shooting. The image processing apparatus in the second application of the invention includes: an image data acquisition module that acquires image data; a memory module that stores multiple scene-dependent image processing conditions as combinations of values of multiple image quality-relating parameters set in advance for multiple shooting scenes; a scene-dependent image processing condition acquisition module that, in the case of successful retrieval of image processing control information, which specifies a scene-dependent image processing condition suitable for the selected shooting scene and is related to the acquired image data, acquires the scene-dependent image processing condition specified by the retrieved image processing control information from the memory module; and an image quality adjustment module that executes image quality adjustment of the image data with the acquired scene-dependent image processing condition.

The image processing apparatus according to the second application of the invention has similar functions and effects to those of the image processing method in the second application of the invention and has various arrangements as discussed above with regard to the image processing method.

The second application of the invention is further actualized by a computer program product storing an image processing program that causes a computer to utilize multiple scene-dependent image processing conditions as combinations of values of multiple image quality-relating parameters set in advance for multiple shooting scenes and to execute a series of image processing suitable for a shooting scene selected at a time of shooting. In the computer program product according to the second application of the invention, the image processing program includes: a program command that retrieves image processing control information, which specifies a scene-dependent image processing condition suitable for the selected shooting scene and is related to acquired image data; a program command that, in the case of successful retrieval of the image processing control information, selects the scene-dependent image processing condition specified by the retrieved image processing control information, among the multiple scene-dependent image processing conditions; and a program command that executes image quality adjustment of the image data with the selected scene-dependent image processing condition.

The computer program product according to the second application of the invention has similar functions and effects to those of the image processing method in the second application of the invention and has various arrangements as discussed above with regard to the image processing method.

A third application of the invention is directed to an image processing method that makes image data, which includes shooting information obtained at a time of shooting, subjected to a series of image processing. The image processing method in the third application of the invention retrieves image processing control information, which is related to the image data and is used to specify an image processing condition; in the case of failed retrieval of the image processing control information, selects an image processing condition, which is suitable for a shooting condition at the time of shooting, based on the shooting information from a memory device that stores multiple different image processing conditions set for the image data; and executes image quality adjustment of the image data with the selected image processing condition.

In accordance with the third application of the invention, even when the image processing control information, which is used to specify the image processing condition, is not available, the image processing method in the third application of the invention utilizes the general shooting information given as attribute information of the image data to acquire the image processing condition, which corresponds to the image data and is suitable for the shooting condition at the time of shooting, and executes image quality adjustment with the obtained image processing condition. This arrangement desirably enables a greater number of image data to be subjected to the image processing suitable for the shooting condition at the time of shooting each of the image data.

In one preferable arrangement of the third application of the invention, in the case of successful retrieval of the image processing control information, the image processing method selects an image processing condition specified by the retrieved image processing control information from the memory device. The procedure of this arrangement utilizes the image processing control information to acquire the image processing condition, thus ensuring execution of image quality adjustment reflecting the intention of the photographer.

In another preferable arrangement of the third application of the invention, when the shooting information includes preset information of shooting scene at the time of shooting, the image processing method selects the image processing condition, based on the preset information of shooting scene. The procedure of this arrangement utilizes the preset information of shooting scene at the time of shooting to acquire the image processing condition, which reflects the shooting scene, and thereby ensures execution of image quality adjustment suitable for the shooting scene.

In still another preferable arrangement of the third application of the invention, the image processing method selects the image processing condition, based on at least information on settings of exposure program, aperture, shutter speed, subject distance range, ISO speed rate, and flash included in the shooting information. These pieces of the shooting information may be used for estimation of the shooting scene.

When the shooting information does not include the preset information of shooting scene at the time of shooting, the image processing condition may be selected, based on at least information on settings of exposure program, aperture, shutter speed, subject distance range, ISO speed rate, and flash included in the shooting information. This arrangement ensures execution of image quality adjustment suitable for the shooting scene, even when the information of shooting scene is not available.

In the image processing method according to the third application of the invention, the image processing condition may be a combination of values of multiple image quality-relating parameters, which are set in advance for each shooting scene. This arrangement ensures adaptation of image quality adjustment for the shooting scene with a high accuracy.

The third application of the invention is also actualized by an image processing apparatus that makes image data, which includes shooting information obtained at a time of shooting, subjected to a series of image processing. The image processing apparatus in the third application of the invention includes: a memory module that stores multiple different image processing conditions set for the image data; a selection module that, in the case of failed retrieval of image processing control information that is related to the image data and is used to specify an image processing condition, selects an image processing condition, which is suitable for a shooting condition at the time of shooting, based on the shooting information from the memory module; and an image quality adjustment module that executes image quality adjustment of the image data with the selected image processing condition.

The image processing apparatus according to the third application of the invention has similar functions and effects to those of the image processing method in the third application of the invention and has various arrangements as discussed above with regard to the image processing method.

The third application of the invention is further actualized by a computer program product storing an image processing program that causes a computer to make image data, which includes shooting information obtained at a time of shooting, subjected to a series of image processing. In the computer program product according to the third application of the invention, the image processing program includes: a program command that retrieves image processing control information that is related to the image data and is used to specify an image processing condition; a program command that, in the case of failed retrieval of the image processing control information, selects an image processing condition, which is suitable for a shooting condition at the time of shooting, based on the shooting information among multiple different image processing conditions set in advance for the image data; and a program command that executes image quality adjustment of the image data with the selected image processing condition.

The computer program product according to the third application of the invention has similar functions and effects to those of the image processing method in the third application of the invention and has various arrangements as discussed above with regard to the image processing method.

A fourth application of the invention is directed to an image processing method that executes image processing of image data having shooting information, which is obtained at a time of shooting and includes information on a selected shooting scene. The image processing method in the fourth application of the invention acquires image data; acquires a scene-dependent image processing condition suitable for the selected shooting scene from a memory device, which stores multiple scene-dependent image processing conditions as image processing conditions suitable for respective shooting scenes; and executes image quality adjustment of the image data with the acquired scene-dependent image processing condition.

The image processing method in the fourth application of the invention obtains the scene-dependent image processing condition suitable for the selected shooting scene and executes image quality adjustment with the acquired scene-dependent image processing condition. This arrangement enables the image data to be subjected to image processing suitable for the shooting scene at the time of shooting.

In one preferable arrangement of the fourth application of the invention, the image data is associated with scene-dependent image processing condition specification information, which is used to specify the scene-dependent image processing condition applied for image processing. The image processing method receives selection information that determines which of the selected shooting scene and the scene-dependent image processing scene condition is to be used to acquire the scene-dependent image processing condition, and acquires the scene-dependent image processing condition from the memory device, according to the received selection information.

The procedure of this arrangement acquires the scene-dependent image processing condition, based on either the selected shooting scene or the scene-dependent image processing condition specification information, which is used to specify the scene-dependent image processing condition applied for image processing. This arrangement enables the image data to be subjected to image processing suitable for a desired shooting scene with desired information.

In the fourth application of the invention, the memory device may store a first scene-dependent image processing condition corresponding to the shooting scene and a second scene-dependent image processing condition corresponding to the scene-dependent image processing condition specification information. The image processing method may select either of the first scene-dependent image processing condition and the second scene-dependent image processing condition according to the received selection information, so as to acquire the scene-dependent image processing condition. This arrangement enables the image data to be subjected to more adequate image processing for a desired shooting scene.

The fourth application of the invention is also actualized by an image processing apparatus that executes image processing of image data having shooting information, which is obtained at a time of shooting and includes information on a selected shooting scene. The image processing apparatus in the fourth application of the invention includes: an image data acquisition module that acquires image data; a memory module that stores multiple scene-dependent image processing conditions as image processing conditions suitable for respective shooting scenes; and an image quality adjustment module that acquires a scene-dependent image processing condition suitable for the selected shooting scene from the memory module and executes image quality adjustment of the image data with the acquired scene-dependent image processing condition.

The image processing apparatus according to the fourth application of the invention has similar functions and effects to those of the image processing method in the fourth application of the invention and has various arrangements as discussed above with regard to the image processing method.

The fourth application of the invention is further actualized by a computer program product storing an image processing program that causes a computer to execute image processing of image data having shooting information, which is obtained at a time of shooting and includes information on a selected shooting scene. In the computer program product according to the fourth application of the invention, the image processing program includes: a program code that acquires image data; a program code that acquires a scene-dependent image processing condition suitable for the selected shooting scene from a memory device, which stores multiple scene-dependent image processing conditions as image processing conditions suitable for respective shooting scenes; and a program code that executes image quality adjustment of the image data with the acquired scene-dependent image processing condition.

The computer program product according to the fourth application of the invention has similar functions and effects to those of the image processing method in the fourth application of the invention and has various arrangements as discussed above with regard to the image processing method.

BRIEF DESCRIPTION OF THE DRAWINGS

FIG. 7 shows settings of multiple image quality-relating parameters, which are stored in an HDD 152 (or a ROM) of a personal computer PC and define options of an image processing mode GM specified by image processing control information GI;

FIG. 11 shows a table that maps the Exif information to the image processing mode GM.

DETAILED DESCRIPTION OF THE PREFERRED EMBODIMENTS

The image processing apparatus of the invention is discussed below as a preferred embodiment with reference to the accompanied drawings.

A. Construction of Image Processing System

Figure 1:
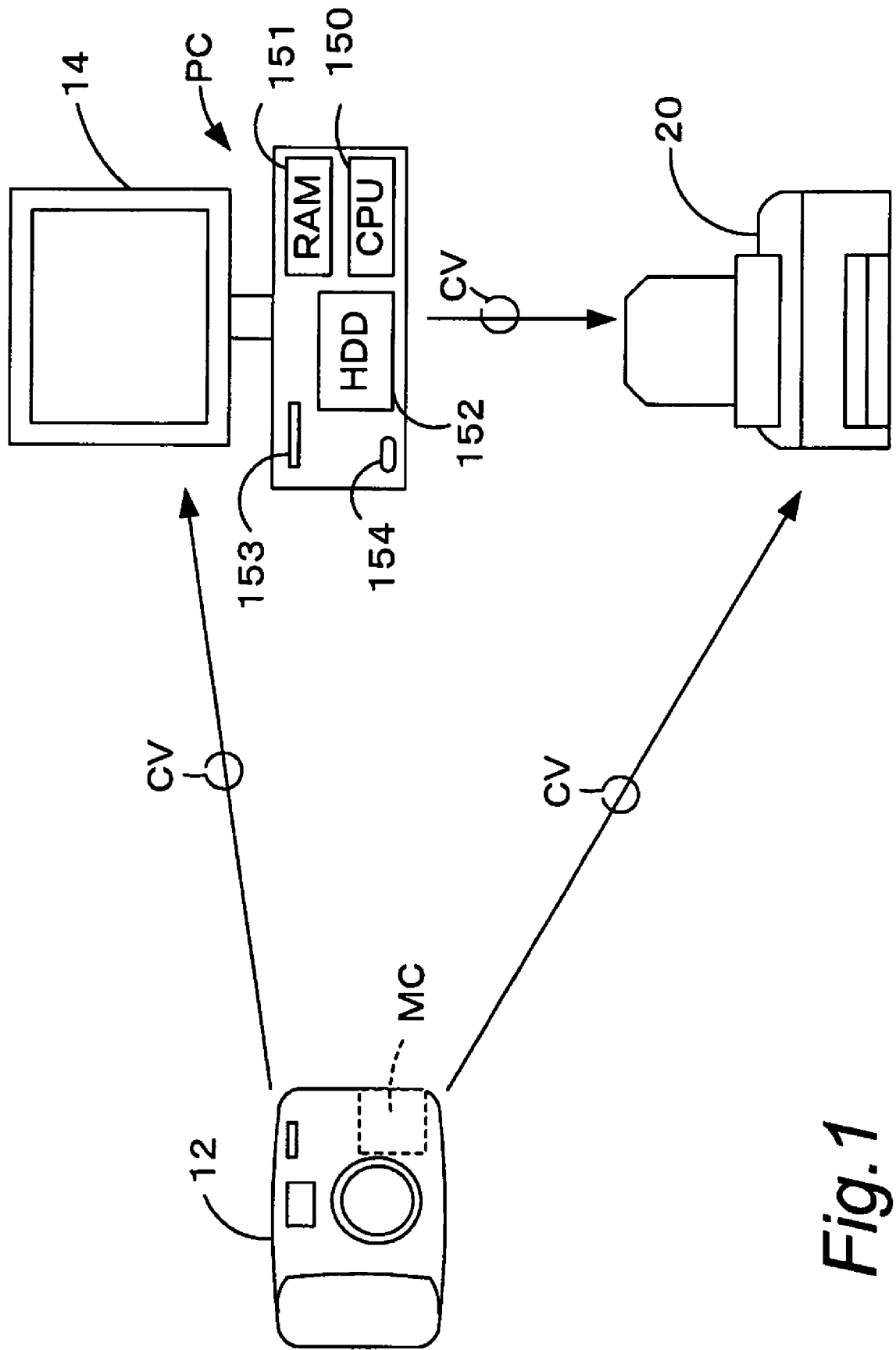
FIG. 1 shows an image processing system as one embodiment, to which an image processing apparatus of the invention is applied.
Figure 2:
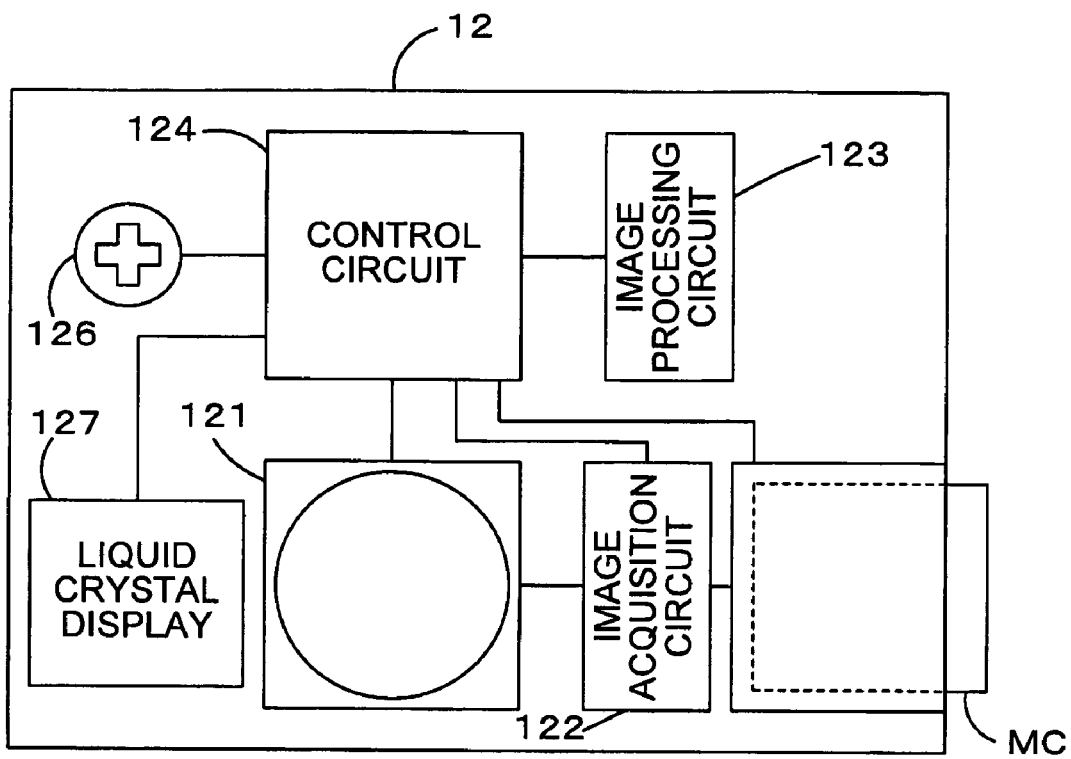
FIG. 2 is a block diagram schematically illustrating the structure of a digital still camera that is usable for generating image files (image data)
Figure 3:
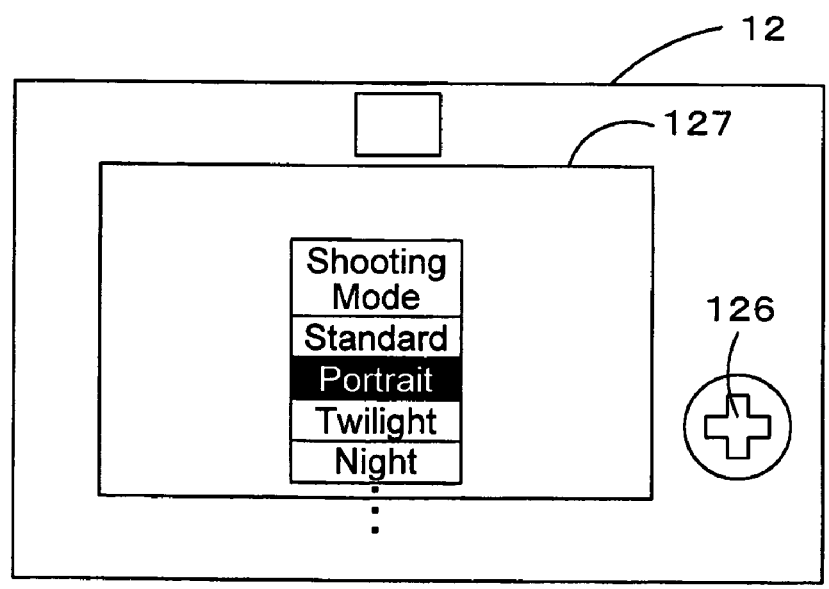
FIG. 3 shows selection of a shooting mode in the digital still camera.
Figure 4:
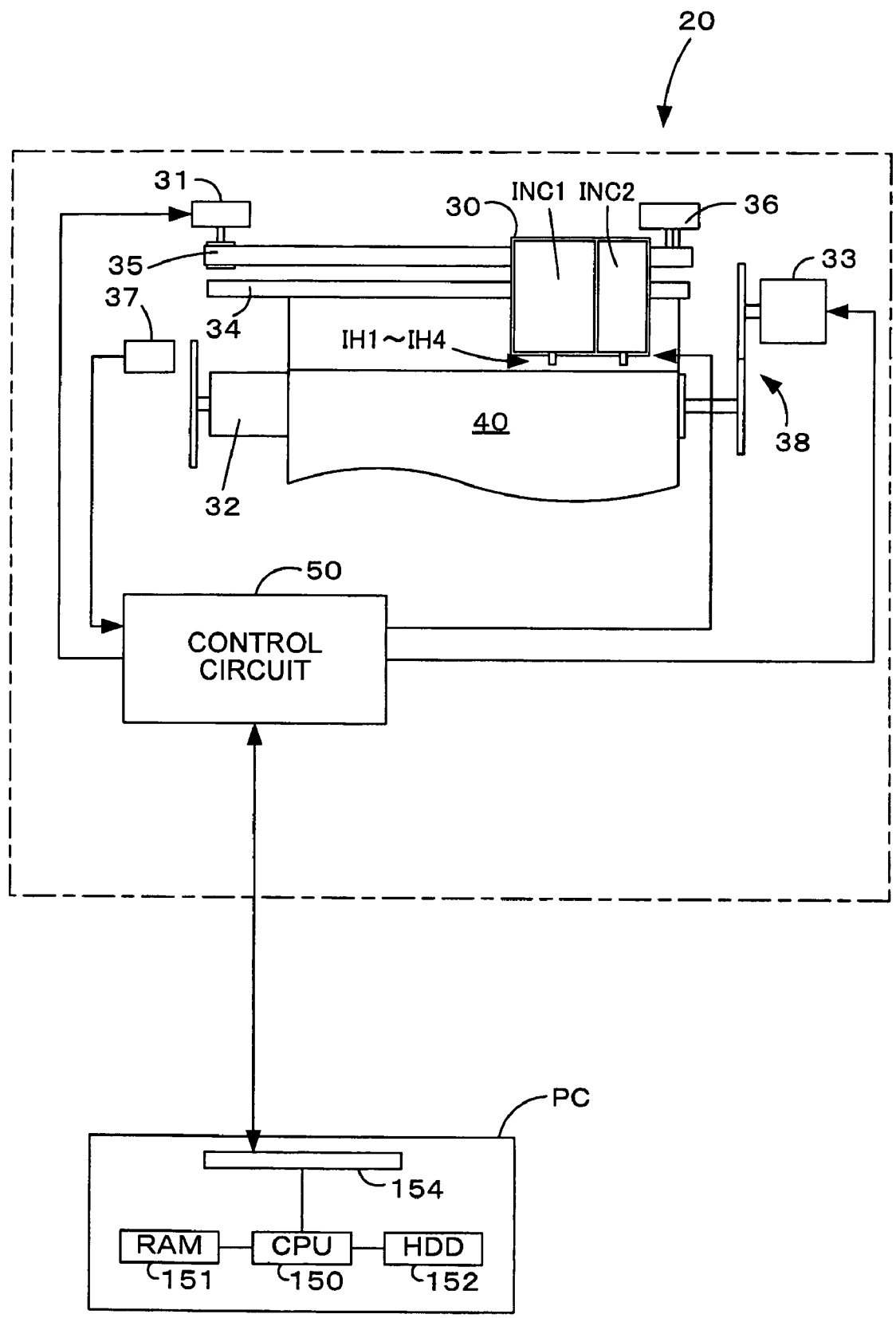
FIG. 4 is a block diagram schematically illustrating the structure of a color printer functioning as an image processing apparatus in the embodiment.

The construction of an image processing system including an image processing apparatus in one embodiment is discussed below with reference to FIGS. 1 through 4. FIG. 1 shows an image processing system as one embodiment, to which an image processing apparatus of the invention is applied. FIG. 2 is a block diagram schematically illustrating the structure of a digital still camera that is usable for generating image files (image data). FIG. 3 shows selection of a shooting mode in the digital still camera. FIG. 4 is a block diagram schematically illustrating the structure of a color printer functioning as an image processing apparatus in the embodiment.

The image processing system includes a digital still camera 12 functioning as an input device to generate an image file, a personal computer PC functioning as an image processing apparatus to execute image processing based on the image file generated by the digital still camera 12 and to output print image data, and a color printer 20 functioning as an output device to output resulting images according to the print image data. The color printer 20 may have the image processing functions of the personal computer PC. In this case, the color printer 20 works as a stand-alone to implement image processing and output of resulting images. The output device is not restricted to the printer 20 but may be a monitor 14 like a CRT display or an LCD display or a projector. In the description below, the color printer 20 connecting with the personal computer PC is used as the output device.

The personal computer PC is a general-purpose computer and includes a CPU 150 that executes an image processing program of the invention, a RAM 151 that temporarily stores the results of operations by the CPU 150 and image data, and a hard disk drive (HDD) 152 that stores the image processing program. The personal computer PC also has a card slot 153 that receives a memory card MC inserted therein and an input output terminal 154 that connects with a connector cable linked with the digital still camera 12.

The digital still camera 12 focuses light information on a digital device (for example, a CCD or an electron multiplier tube) to acquire an image, and has an optical circuit 121 including the CCD or the like to collect the light information, an image acquisition circuit 122 that controls the optical circuit 121 to acquire a digital image, an image processing circuit 123 that processes the acquired digital image, and a control circuit 124 that has a memory and controls the respective circuits, as shown in FIG. 2. The digital still camera 12 stores the acquired images as digital data into a memory device, such as a memory card MC. The JPEG data format as an irreversible compression storage system and the TIFF data format as a reversible compression storage system are typically applied for storage of image data in the digital still camera 12. Other storage formats like the RAW data format, the GIF data format, and the BMP data format are also applicable for storage of image data.

As shown in FIG. 3, the digital still camera 12 also has a selection/set button 126 and a liquid crystal display 127, which is used to preview each shot image and effectuate selection and setting through operations of the selection/set button 126. The selection/set button 126 may be used to set a shooting mode, which specifies shooting conditions including a shutter speed, an exposure program, and an ISO speed rate, as well as values of multiple shooting parameters corresponding to each shooting scene, such as twilight scene, nightscape, or portrait.

When the digital still camera 12 has the function of specifying a series of image processing to be executed by the image processing apparatus with image processing control information GI, the selection/set button 126 may be used to set individual image processing control parameters, such as lightness, contrast, quantity of exposure correction (exposure correction value), and white balance, or to set an image processing mode (shooting mode), which specifies values of multiple image processing control parameters used in the image processing apparatus according to the shooting conditions. The selection/set button 126 may otherwise be used to set both the shooting mode and the image processing mode.

The digital still camera 12 maps image processing control information GI, which is used to specify image processing of image data executed by the image processing apparatus (the color printer 20 and the personal computer PC), or Exif information, which represents shooting information at the time of shooting image data, to the image data and stores the mapping in the form of an image file GF into the memory card MC. When the user selects a shooting mode (shooting scene), for example, portrait, nightscape, or twilight scene, suitable for shooting conditions, the procedure maps the selected shooting mode as the Exif information to the image data or maps an image processing mode, which corresponds to the selected shooting mode and specifies values or levels of multiple image processing control parameters including contrast, saturation, and sharpness, to the image data and stores the mapping into the memory card MC. The multiple image processing control parameters may include individually settable parameters like the quantity of exposure correction and the white balance. The settings of shooting parameters applied for each shooting mode and image processing parameters are related to the shooting mode and are stored on the memory in the control circuit 124 of the digital still camera 12.

The image file GF generated by the digital still camera 12 is transmitted to the color printer 20 via a connector cable CV and the computer PC or directly via the connector cable CV. The image file GF is otherwise transmitted to the color printer 20 by inserting the memory card MC, in which the image file GF has been stored by the digital still camera 12, into a memory card slot of the computer PC or by directly connecting the memory card MC with the printer 20. In the structure of the embodiment, the personal computer PC executes image processing of the image data with the image processing control information GI and outputs the processed image data to the color printer 20.

The color printer 20 shown in FIG. 4 is capable of outputting color images and is, for example, an ink jet printer that ejects four color inks, cyan (C), magenta (M), yellow (Y), and black (K), on a printing medium to create a dot pattern and thereby form an image. Another example of the color printer 20 is an electrophotographic printer that transfers and fixes color toners on a printing medium to form an image. Other color inks, light cyan (LC), light magenta (LM), and dark yellow (DY) may also be used, in addition to the above four color inks.

As illustrated, the color printer 20 has a mechanism that drives print heads IH1 through IH4 mounted on a carriage 30 to eject inks and create dots, a mechanism that activates a carriage motor 31 to reciprocate the carriage 30 along a shaft of a platen 32, a mechanism that activates a sheet feed motor 33 to feed a cut sheet of printing paper 40, and a control circuit 50. The mechanism of reciprocating the carriage 30 along the shaft of the platen 32 has a sliding shaft 34 that holds the carriage 30 arranged in parallel with the shaft of the platen 32 in a slidable manner and a pulley 36 that supports an endless belt 35 spanned between the carriage motor 31 and the pulley 36.

The control circuit 50 adequately controls the operations of the sheet feed motor 33, the carriage motor 31, and the print heads IH1 through IH4 in response to a print command sent from the personal computer PC and outputs image data sent from the personal computer PC as an image on a printing medium. Ink cartridge INC1 and INC2 are attached to the carriage 30. The ink cartridge INC1 keeps black (K) ink, whereas the ink cartridge INC2 keeps the other inks, that is, the three color inks, cyan (C), magenta (M), and yellow (Y). Additional inks of light cyan (LC), light magenta (LM), and dark yellow (DY) may also be kept in the ink cartridge, as mentioned previously.

B. Structure of Image File

The image file GF of this embodiment may have, for example, a file structure in conformity with the Exif format (Exif file) that was specified as a standard of the image file format for digital still cameras by Japan Electronics and Information Technology Industries Association (JEITA), a file structure in conformity with the JFIF format (JFIF file) that was specified as a standard for making JPEG data files compatible by three corporations, C-Cube Microsystems, Xing Technology, and Digital Origin (Radius), or a file structure in conformity with the TIFF format (TIFF file) that specifies parameters relating to image data in the form of tags. The Exif files are classified by the type of image data stored therein into JPEG-Exif files that store JPEG image data in an irreversible compressed form and TIFF-Exif files that store TIFF image data in a reversible compressed form.

Figures 5, 6:
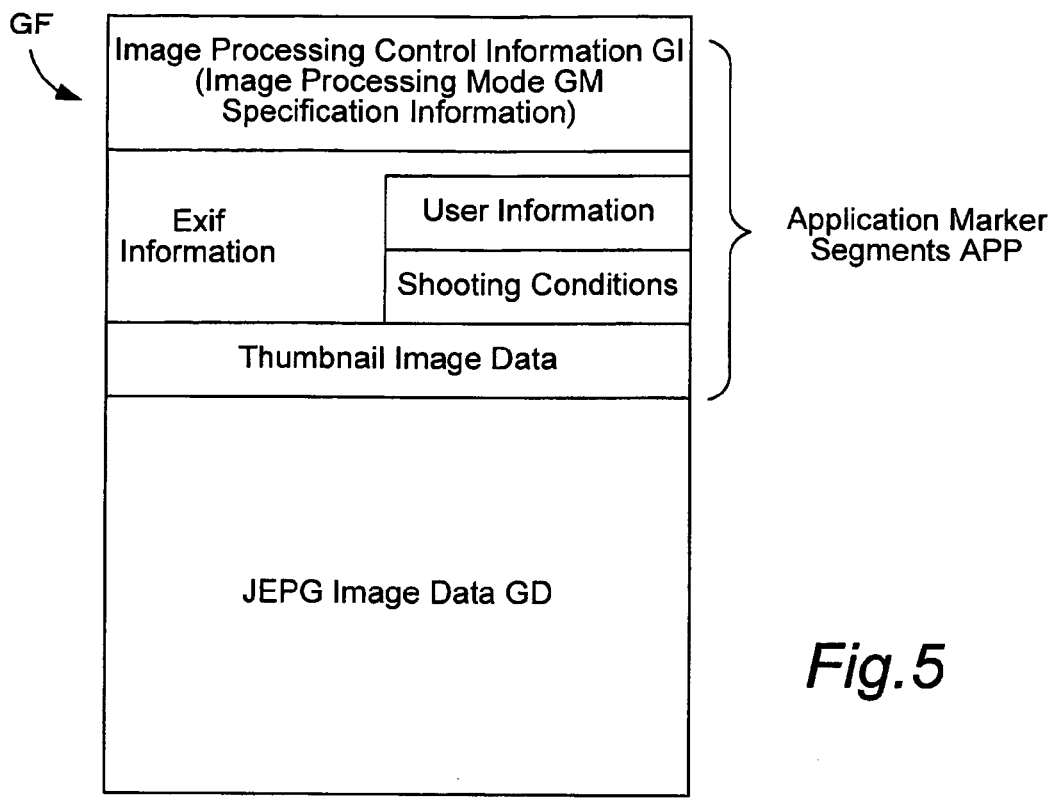
FIG. 5 shows the file structure of an Exif image file.
FIG. 6 shows the detailed internal structure of shooting condition tags in the Exif file format used in the embodiment.

The general structure of an Exif image file as a JPEG data storage file used in this embodiment is discussed below with reference to FIGS. 5 through 7. FIG. 5 shows the file structure of an Exif image file. FIG. 6 shows the detailed internal structure of shooting condition tags in the Exif file format used in the embodiment. FIG. 7 shows settings of multiple image quality-relating parameters, which are stored in the HDD 152 (or the ROM) of the personal computer PC and define options of an image processing mode GM specified by the image processing control information GI. The terminology 'file structure', 'data structure', and 'storage area' used in this embodiment represents the image of a file or data in the storage state in a storage device.

The image file GF includes JPEG image data GD and application marker segments APP to store attribute information of the JPEG image data GD. The application marker segments APP (IFD) use tags for identifying respective pieces of information, and each piece of information may be expressed by its corresponding tag name. The application marker segments APP shown in FIG. 5 include tags (area) for storing the image processing control information GI, tags (area) for storing the Exif information, and thumbnail image data.

Settings of image quality-relating parameters applied for image processing executed by the personal computer PC or the color printer 20 are described in the image processing control information GI. The image quality-relating parameters include, for example, YCbCr to RGB color conversion matrix elements and gamma correction values, contrast, saturation, sharpness, lightness, and color balance of the digital still camera 12. The image processing control information GI also includes image processing mode specification information, which is used to specify an image processing mode GM corresponding to a shooting mode selected at the time of shooting. The image processing mode GM is defined by multiple image quality-relating parameters, for example, contrast and saturation, as shown in FIG. 7. Each of the image quality-relating parameters takes different values corresponding to different image processing modes GM (shooting modes). A number is allocated to each image processing mode GM. The image processing control information GI specifies a number to identify each image processing mode GM.

The Exif information includes tags for storing user information and tags for storing shooting conditions. The user information tags include a Makernote tag arbitrarily usable by the Exif file user (for example, the manufacturer of the DSC). The image processing control information GI may be described in this Makernote tag. Settings of various parameters relating to shooting conditions including an exposure program and a shutter speed are described in the shooting condition tags as shown in FIG. 6.

C. Image Processing Executed by Personal Computer PC

Figure 8:
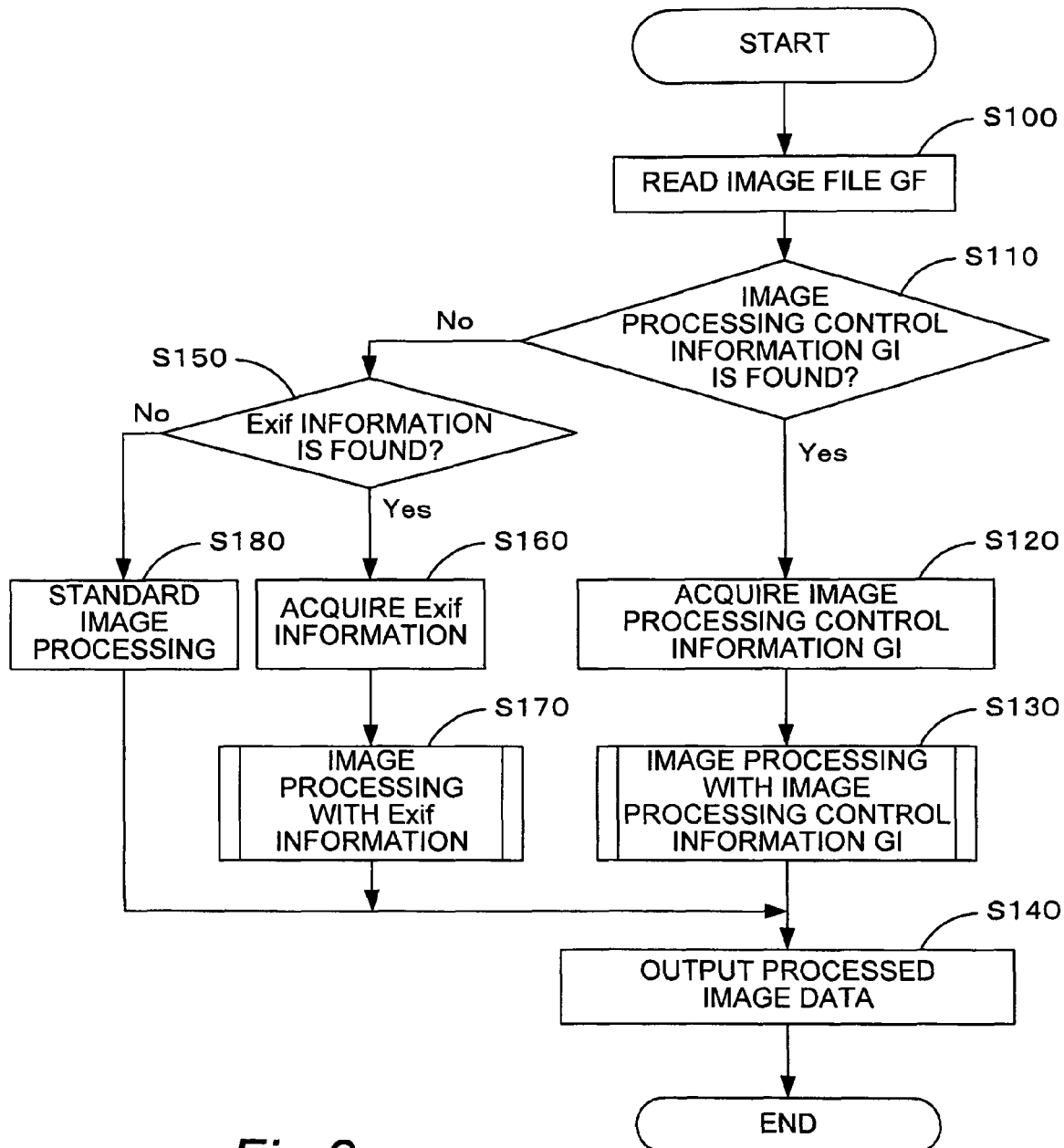
FIG. 8 is a flowchart showing an image processing routine executed by an image processing apparatus (personal computer PC) in the embodiment.
Figure 9:
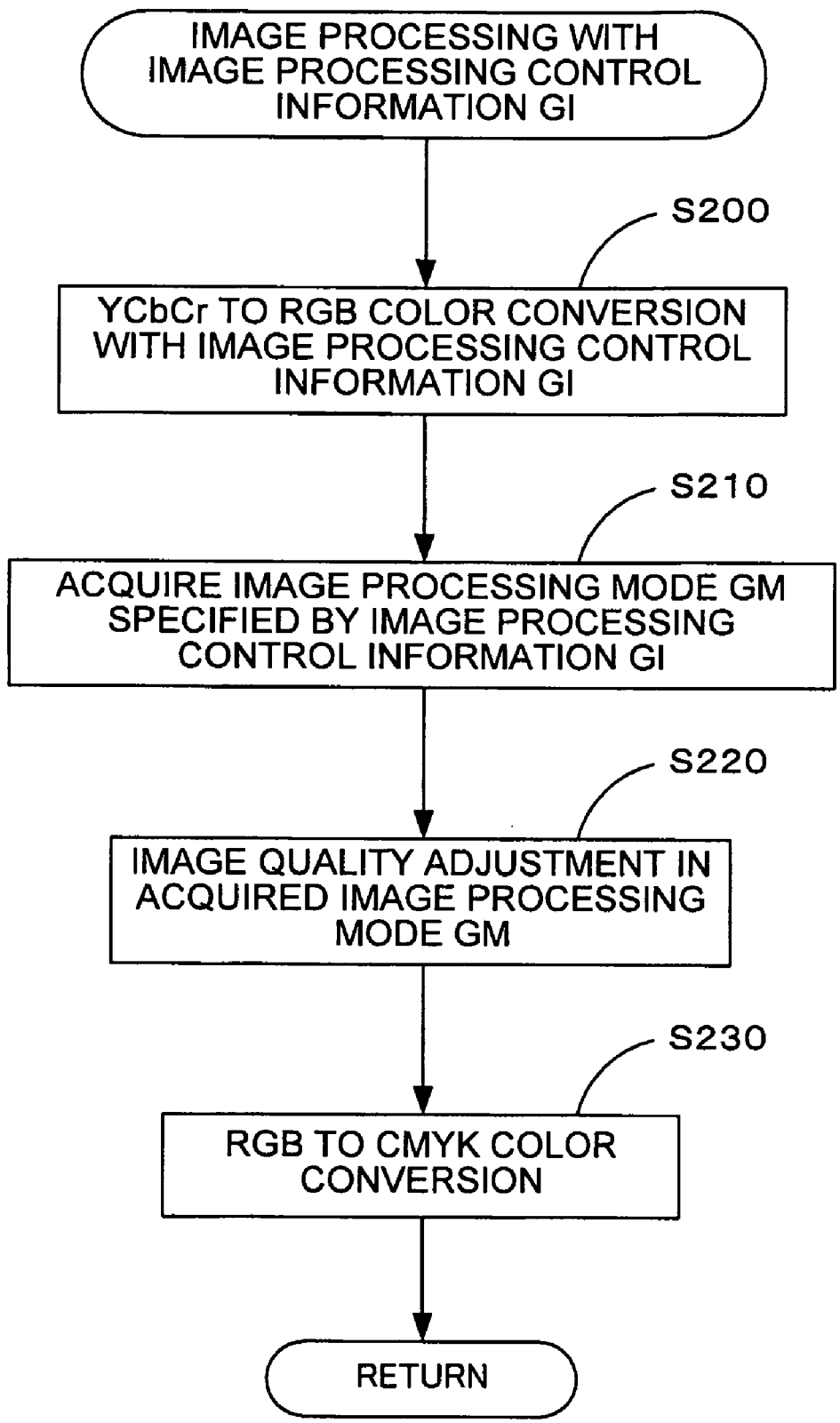
FIG. 9 is a flowchart showing an image quality adjustment routine with the image processing control information GI executed by the image processing apparatus (personal computer PC) in the embodiment.
Figure 10:
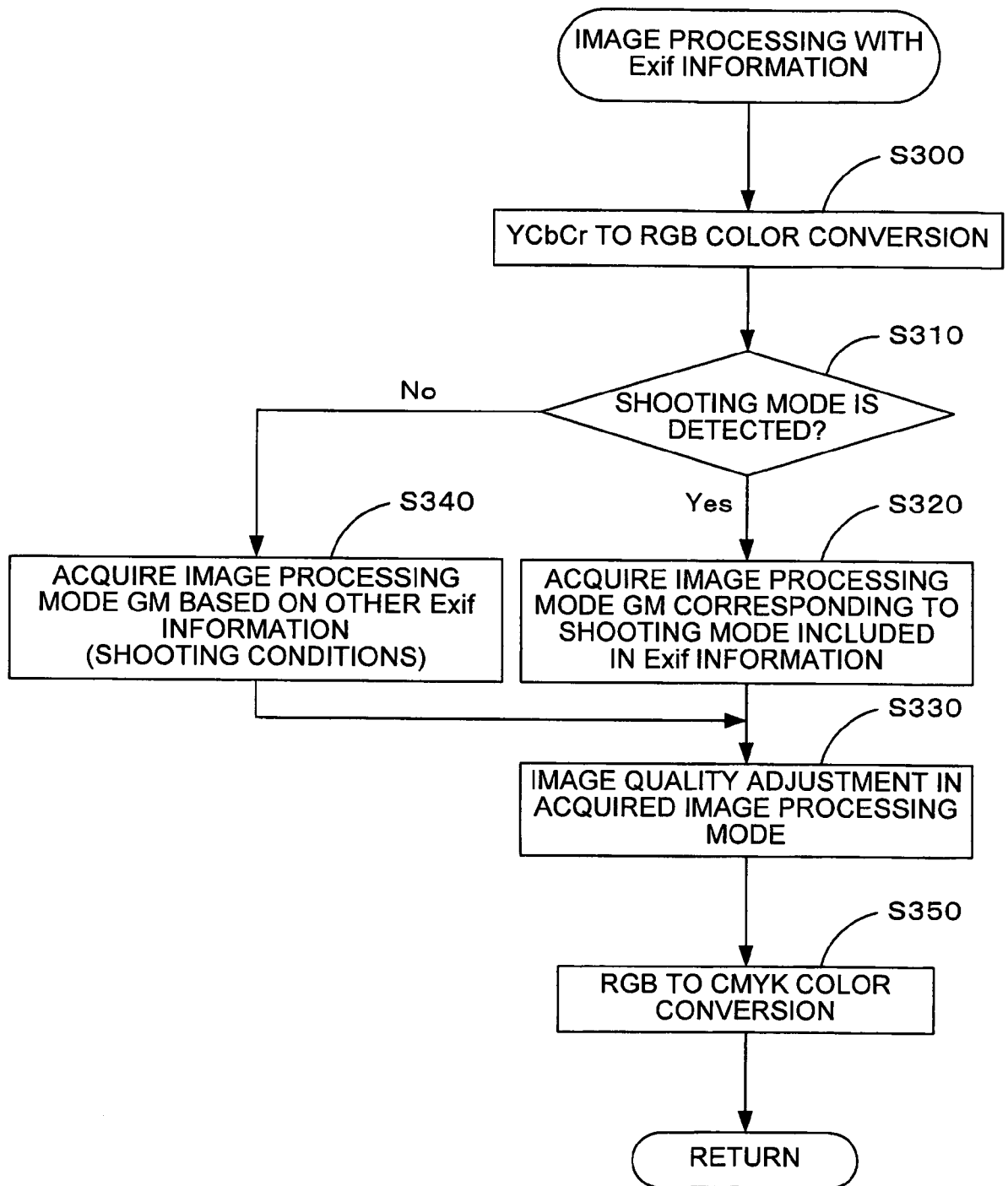
FIG. 10 is a flowchart showing an image quality adjustment routine with Exif information executed by the image processing apparatus (personal computer PC) in the embodiment.

A series of image processing executed by the personal computer PC is discussed below with reference to FIGS. 8 through 11. FIG. 8 is a flowchart showing an image processing routine executed by the image processing apparatus (the personal computer PC) in the embodiment. FIG. 9 is a flowchart showing an image quality adjustment routine with the image processing control information GI executed by the image processing apparatus (the personal computer PC) in the embodiment. FIG. 10 is a flowchart showing an image quality adjustment routine with the Exif information executed by the image processing apparatus (the personal computer PC) in the embodiment. FIG. 11 shows a table that maps the Exif information to the image processing mode GM.

The CPU 150 of the personal computer PC activates an image quality adjustment program, in response to insertion of the memory card MC into the card slot 153 or in response to connection of the connector cable CV linked with the digital still camera 12 to the input output terminal 154. The CPU 150 first reads an image file GF from the memory card MC according to the user's instruction and temporarily stores the read-out image file GF into the RAM 151 (step S100).

The CPU 150 determines whether the image file GF includes the image processing control information GI (step S110). When the image processing control information GI is found (detected) in the image file GF (step S110: Yes), the CPU 150 acquires the image processing control information GI (step S120) and executes a series of image processing (image quality adjustment) with the acquired image processing control information GI (step S130).

The series of image processing with the image processing control information GI is described with reference to FIG. 9. The CPU 150 extends the image data GD included in the read-out image file GF and sequentially carries out matrix algebra with a matrix S on the extended image data GD, gamma correction with gamma correction values specified by the acquired image processing control information GI, and matrix algebra with a matrix $N^{-1}M$ including a matrix M, so as to implement color conversion of YCbCr into wRGB (step S200).

The image file GF processed according to this flowchart stores JPEG image data, which represent YCbCr data in a compressed form. RGB data are generally used for image processing executed by the personal computer PC and the printer. Extension (decoding) of the JPEG data and the color conversion of YCbCr data into RGB data are accordingly required. The matrix S is typically used for conversion of YCbCr data into RGB data in the JFIF format as is known in the art, and is thus not specifically described here. For linearization of the relation to XYZ values in the course of color conversion, the gamma correction is carried out with the gamma correction values specified by the image processing control information GI to attain linearization of the image data GD.

The procedure of this embodiment carries out RGB to wRGB color conversion with the matrix $N^{-1}M$ including the matrix M, which takes into account the color reproduction characteristics of the color printer 20, in addition to the general YCbCr to RGB color conversion with the matrix S. The matrix M has elements specified by the image processing control information GI, and is used to convert the color space from an RGB color space (target color space) that defines (specifies) RGB data after the matrix algebra with the matrix S into an XYZ color space that is a device-dependent color space. When the RGB data after the matrix algebra with the matrix S have RGB values out of the color range of an sRGB color space, a wRGB color space at least partly having a wider color range than the sRGB color space is specified as the color space defining the RGB data after matrix algebra with the matrix S. This arrangement effectively prevents loss of the RGB values and leads to a subsequent wider wRGB color space (working color space). The matrix N is used to convert the color space from an RGB color space allowed by the color printer 20, for example, a wRGB color space, into an XYZ color space. The matrix $N^{-1}M$ is a composite matrix to attain color conversion from RGB to XYZ to wRGB.

The CPU 150 acquires the image processing mode GM specified by the image processing control information GI (step S210) and executes image quality adjustment of the resulting RGB data obtained by the color conversion with a set of parameters specified by the acquired image processing mode GM (step S220). According to a concrete procedure, the CPU 150 carries out image quality adjustment with the settings of the image quality-relating parameters defined by one of the options 1 through 11 of the image processing modes GM shown in FIG. 7, which corresponds to the number specified by the image processing control information GI. The procedure of image quality adjustment is explained in detail. The CPU 150 analyzes the image data GD in units of pixel and obtains values of various characteristic parameters representing the characteristics of the image data GD, for example, image statistics like a minimum luminance, a maximum luminance, and a representative lightness. The CPU 150 specifies correction values to cancel or at least reduce differences between reference values, which are preset for the respective characteristic parameters and are stored in the HDD 152, and the image statistics obtained by the analysis, and corrects the RGB values of the image data GD. The correction of the image data GD, for example, corrects a tone curve, which defines a relation between input and output, with the specified correction values and substitutes the image data GD as an input into the corrected tone curve.

The parameter values specified by the image processing mode GM are used to change the degree of cancellation or the degree of reduction (the amount of correction) of the difference between the reference value and the image statistic, while being directly reflected on the amount of correction (the correction value).

For example, when a number '2' is set as the image processing mode GM, the degrees of correction to the reference values are set as slightly softer (Slightly weaker) for contrast, slightly brighter (slightly stronger) for lightness, standard for color balance, slightly lower (slightly weaker) for saturation, and slightly weaker for sharpness. The flesh color is set as the stored color, so that flesh color data (RGB values) stored in advance in the HDD 152 are used for the image processing. The noise reduction is set OFF. The image quality adjustment is carried out in the image processing mode corresponding to each shooting scene. When the selected shooting scene is twilight scene, for example, red color seepage is not removed. When the selected shooting scene is nightscape, in another example, the image data is not corrected to be brighter by lightness correction. Namely this arrangement ensures execution of image quality adjustment reflecting the intention of the photographer.

The image processing control information GI may include individually settable, image quality-relating parameters, such as lightness and contrast, other than a set of image quality-relating parameters for specifying the image processing mode GM. Such individually settable parameters are not specifically described here.

The CPU 150 carries out color conversion to convert the resulting image data (RGB data) after the image quality adjustment into CMYK data (step S230), and returns to the image processing routine shown in FIG. 8. This process converts the color system of the image data to the CMYK color system adopted by the color printer 20 for execution of printing. A concrete procedure refers to a lookup table, which maps the RGB color system to the CMYK color system and is stored in the HDD 152 (ROM).

When the series of image processing discussed above is concluded and the program returns to the image processing routine shown in FIG. 8, the CPU 150 carries out a print output process of the resulting image data (step S140) and then exits from this processing routine. In the print output process, the CPU 150 successively executes a halftoning process and a resolution conversion process and transmits the processed data as raster data to the control circuit 50 of the color printer 20.

When the image processing control information GI is not detected in the image file GF (step S110: No), the CPU 150 determines whether the Exif information is detected in the image file GF (step S150). When the Exif information is not retrieved in the image file GF (step S150: No), the CPU 150 carries out a series of standard image processing with preset image processing conditions, which do not depend upon the selected shooting mode (step S180), outputs the processed image data (step S140), and exits from this processing routine. The standard image processing may execute image quality adjustment with reference values.

When the Exif information is retrieved in the image file GF (step S150: Yes), on the other hand, the CPU 150 acquires the Exif information (step S160) and carries out a series of image processing (image quality adjustment) with the acquired Exif information (step S170).

The series of image processing with the Exif information is discussed below with reference to FIG. 10. The CPU 150 extends the image data GD included in the read-out image file GF and carries out matrix algebra with the matrix S on the extended image data GD, so as to attain YCbCr to RGB color conversion (step S300). The CPU 150 subsequently determines whether a selected shooting mode, for example, portrait, twilight scene, or nightscape, is described in the Exif information (step S310).

When the shooting mode is detected in the Exif information (step S310: Yes), the CPU 150 selects and acquires the image processing mode GM corresponding to the shooting mode described in the Exif information (step S320) and executes image quality adjustment in the acquired image processing mode GM (step S330). In general, the number of shooting modes described as the Exif information is less than the number of image processing modes GM. No problem accordingly arises in the mapping of the Exif information to the image processing mode GM. When the number of shooting modes described as the Exif information exceeds the number of image processing modes GM, the number of image processing modes GM is simply to be increased. The image quality adjustment in the image processing mode GM follows the procedure of image processing with the image processing control information GI discussed above.

When the shooting mode is not detected in the Exif information (step S310: No), on the other hand, the CPU 150 selects and acquires the image processing mode GM based on other shooting conditions described in the Exif information (step S340) and executes image quality adjustment in the acquired image processing mode GM (step S330). A table shown in FIG. 11 is, for example, applicable for the mapping of the shooting conditions to the image processing mode GM. The shooting conditions used in this embodiment are a combination of an exposure program for setting the priority to either of the shooting parameters, the exposure or the shutter speed, an aperture value (F number) representing the setting of light exposure to the CCD, a shutter speed representing the setting of an exposure time to the CCD, a subject distance range, an ISO speed rate representing the sensitizing quantity, and a flash operating state like prohibited emission or forcible emission. These shooting conditions are only illustrative and not restrictive in any sense. Other shooting conditions including white balance, gain control, contrast, saturation, and sharpness of shooting, a digital zoom magnification, an exposure time, a light source, and a subject area may adequately be added to the above combination or used in different combinations.

The CPU 150 carries out color conversion to convert the resulting image data (RGB data) after the image quality adjustment into CMYK data (step S350), and returns to the image processing routine shown in FIG. 8. This process converts the color system of the image data to the CMYK color system adopted by the color printer 20 for execution of printing. A concrete procedure refers to a lookup table, which maps the RGB color system to the CMYK color system and is stored in the HDD 152 (ROM).

When the series of image processing discussed above is concluded and the program returns to the image processing routine shown in FIG. 8, the CPU 150 carries out the print output process of the resulting image data (step S140) and then exits from this processing routine. In the print output process, the CPU 150 successively executes a halftoning process and a resolution conversion process and transmits the processed data as raster data to the control circuit 50 of the color printer 20.

As described above, when the image processing control information GI includes the information for specifying the image processing mode GM, the personal computer PC functioning as the image processing apparatus of the embodiment executes image processing (image quality adjustment) in the image processing mode GM selected according to the mode-specifying information. This arrangement ensures execution of image quality adjustment corresponding to the shooting mode selected at the time of shooting, that is, image processing to give the photographer's desired output image.

When the information for specifying the image processing mode GM is not included in the image processing control information GI, the procedure executes image quality adjustment in the selected image processing mode GM corresponding to the shooting mode described as the Exif information. This arrangement ensures execution of image quality adjustment corresponding to the shooting mode selected at the time of shooting, that is, image processing that reflects the intention of the photographer.

When the shooting mode is not described as the Exif information, the procedure uses the Exif information other than the shooting mode to select the image processing mode GM corresponding to the shooting mode at the time of shooting and executes image quality adjustment in the selected image processing mode GM. As long as the Exif information is included in the image file GF, this arrangement ensures execution of image processing corresponding to the shooting scene at the time of shooting, that is, the image quality adjustment reflecting the photographer's intention.

The personal computer PC functioning as the image processing apparatus of the embodiment selectively executes an adequate series of image processing among the three options discussed above according to the image file GF. This arrangement ensures execution of the most adequate image quality adjustment well reflecting the photographer's intention and enables a greater number of image files GF to be subjected to the desired image quality adjustment.

The procedure of the above embodiment utilizes either the information for specifying the image processing mode GM or the shooting mode described as the Exif information to specify the image processing mode GM, based on whether the information for specifying the image processing mode GM is included in the image processing control information GI. One possible modification may utilize either the information for specifying the image processing mode GM or the shooting mode described as the Exif information to specify the image processing mode GM, in response to the user's selection. This modified arrangement ensures execution of image processing that adequately reflects the user's intention.

The procedure of the above embodiment adopts the image processing mode GM corresponding to the image processing control information GI. One possible modification provides an image processing mode GM' corresponding to the shooting mode, in addition to the image processing mode GM corresponding to the image processing control information GI, and executes image processing, in response to the user's selection, either in the image processing mode GM corresponding to the information for specifying the image processing mode GM or in the image processing mode GM' corresponding to the shooting mode described as the Exif information. This arrangement ensures execution of adequate image processing that well reflects the user's intention.

When the image processing control information GI does not include the information for specifying the image processing mode GM, the procedure executes image quality adjustment in the image processing mode GM, which is selected corresponding to the shooting mode described as the Exif information. This arrangement ensures image quality adjustment corresponding to the selected shooting mode, that is, image processing that well reflects the photographer's intention.

In the structure of the above embodiment, the personal computer PC functioning as the image processing apparatus executes the whole series of image processing and outputs the processed image data to the color printer 20. In one modified structure, the color printer 20 may execute, without the assistant of the personal computer PC, all or part of the image processing and create a dot pattern according to the processed image data GD on a printing medium. The computer may assist the execution. In such modification, the color printer 20 has the image processing functions discussed above with reference to FIGS. 8 through 11. The image file GF generated by the digital still camera 12 is directly transmitted to the color printer 20 via the cable or via the memory card MC. The image processing program is automatically activated in response to detection of insertion of the memory card MC or in response to detection of attachment of the cable, to automatically perform input of the image file GF, retrieval of the image processing control information GI and the Exif information, conversion of the image data GD, and image quality adjustment. Another possible modification provides an auto image quality adjustment button on the operation panel of the color printer 20. The auto image quality adjustment process discussed in the above embodiment may be executed only in the case of selection of an auto image quality adjustment mode through the operation of the auto image quality adjustment button.

In the structure of the above embodiment, the color printer 20 is used as the output device. The output device may be a display device, such as a CRT, an LCD, or a projector. In such cases, the display device functioning as the output device executes an image processing program (display driver) to implement the image processing described above with reference to FIGS. 8 through 11. When the CRT or the like functions as a display device of the computer, the computer executes the image processing program. Here the eventually output image data has the RGB color space, instead of the CMYK color space.

The resulting display on the display device, such as the CRT, reflects the image processing control information GI, as the resulting print by the color printer 20 reflects the information obtained at the time of generating the image data. This arrangement ensures accurate display of the image data GD generated by the digital still camera 12.

The embodiment regards the image file complying with the Exif file format as a concrete example of the image file GF. The image processing apparatus of the invention is, however, not restricted to processing of the image files of this format, but is also applicable to processing of the image files GF complying with the JFIF file format and those complying with the TIFF file format. The image file processible by the image processing apparatus of the invention is required to include the image data GD and at least either of the image processing control information GI and the Exif information related to the image data GD.

In the embodiment discussed above, the personal computer PC and the color printer 20 are only illustrative and are not restricted to the structure discussed above. The personal computer PC and the color printer 20 are required to have at least the functions of retrieving the image processing control information GI or the Exif information in the image file GF, which may store both of the image processing control information GI and the Exif information, selecting the image processing mode GM based on the retrieved information, carrying out auto image quality adjustment in the selected image processing mode GM, and outputting (printing) the processed image.

In the structure of the above embodiment, the image data GD and the image processing control information GI are included in the identical image file GF. The image data GD and the image processing control information GI may not be stored in an identical file. The requirement is that the image data GD is related to the image processing control information GI. One possible modification generates mapping data to relate the image data GD to the image processing control information GI, stores one or multiple image data GD and the image processing control information GI in separate files, and refers to the image processing control information GI related to the image data GD at the time of processing the image data GD. In this modified structure, the image data is inseparably integrated with the image processing control information GI in the course of image processing with the image processing control information GI. This gives the substantially equivalent functions to those attained by storage in the identical file. The technique is also applicable to video files stored in optical disk media, such as CD-ROMs, CD-Rs, DVD-ROMs, and DVD-RAMs.

The image processing apparatus and the image processing method of the invention are described above with reference to some embodiments. These embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. An image processing method that executes image processing of image data having shooting information, which is obtained at a time of shooting and includes information on a selected shooting scene, said image processing method comprising:
   acquiring image data, the image data being associated with scene-dependent image processing condition specification information, the scene-dependent image processing condition specification information being used to specify a scene-dependent image processing condition applied for image processing, wherein the scene-dependent image processing condition specification information allows a digital still camera to specify a condition for image processing to be performed in an image processing apparatus, and wherein the scene-dependent image processing condition specification information does not include a shooting time condition;
   receiving selection information that determines which of the selected shooting scene and the scene-dependent image processing condition specification information is to be used to acquire the scene-dependent image processing condition;
   acquiring a scene-dependent image processing condition suitable for the selected shooting scene from a memory device, which stores multiple scene-dependent image processing conditions as image processing conditions suitable for respective shooting scenes; and
   executing image quality adjustment of the image data with the acquired scene-dependent image processing condition, wherein
   said memory device stores a first scene-dependent image processing condition corresponding to the selected shooting scene and a second scene-dependent image processing condition corresponding to the scene-dependent image processing condition specification information,
   said acquiring the scene-dependent image processing condition is implemented with selecting either of the first scene-dependent image processing condition and the second scene-dependent image processing condition according to the received selection information, and
   each operation of the image processing method is executed by a CPU.

2. An image processing apparatus that executes image processing of image data having shooting information, which is obtained at a time of shooting and includes information on a selected shooting scene, said image processing apparatus comprising:

an image data acquisition module that acquires image data, the image data being associated with scene-dependent image processing condition specification information, the scene-dependent image processing condition specification information being used to specify a scene-dependent image processing condition applied for image processing, wherein the scene-dependent image processing condition specification information allows a digital still camera to specify a condition for image processing to be performed in an image processing apparatus, and wherein the scene-dependent image processing condition specification information does not include a shooting time condition;

a memory module that stores multiple scene-dependent image processing conditions as image processing conditions suitable for respective shooting scenes; and an image quality adjustment module that acquires a scene-dependent image processing condition suitable for the selected shooting scene from said memory module and executes image quality adjustment of the image data with the acquired scene-dependent image processing condition, wherein said memory module stores a first scene-dependent image processing condition corresponding to the selected shooting scene and a second scene-dependent image processing condition corresponding to the scene-dependent image processing condition specification information, and said image quality adjustment module receives selection information that determines which of the selected shooting scene and the scene-dependent image processing condition specification information is to be used to acquire the scene-dependent image processing condition, and selects either of the first scene-dependent image processing condition and the second scene-dependent image processing condition according to the received selection information.

3. A computer program product that includes a non-transitory computer-readable storage medium having an image processing program stored thereon, said image processing program causing a computer to execute image processing of image data having shooting information, which is obtained at a time of shooting and includes information on a selected shooting scene, and said image processing program comprising:

a program code that acquires image data, the image data being associated with scene-dependent image processing condition specification information, the scene-dependent image processing condition specification information being used to specify a scene-dependent image processing condition applied for image processing, wherein the scene-dependent image processing condition specification information allows a digital still camera to specify a condition for image processing to be performed in an image processing apparatus, and wherein the scene-dependent image processing condition specification information does not include a shooting time condition;

a program code that receives selection information that determines which of the selected shooting scene and the scene-dependent image processing condition specification information is to be used to acquire the scene-dependent image processing condition;

a program code that acquires a scene-dependent image processing condition suitable for the selected shooting scene from a memory device, which stores multiple scene-dependent image processing conditions as image processing conditions suitable for respective shooting scenes; and a program code that executes image quality adjustment of the image data with the acquired scene-dependent image processing condition, wherein said memory device stores a first scene-dependent image processing condition corresponding to the selected shooting scene and a second scene-dependent image processing condition corresponding to the scene-dependent image processing condition specification information, and said program code that acquires the scene-dependent image processing condition selects either of the first scene-dependent image processing condition and the second scene-dependent image processing condition according to the received selection information.

* * * * *